June 9, 1964          E. R. MANN          3,136,698

SERVO-CONTROLLED REGULATOR FOR NEUTRONIC REACTORS

Filed Aug. 24, 1962

INVENTOR.
Estle R. Mann
BY
ATTORNEY.

United States Patent Office 3,136,698
Patented June 9, 1964

3,136,698
SERVO-CONTROLLED REGULATOR FOR
NEUTRONIC REACTORS
Estle R. Mann, Oak Ridge, Tenn., assignor to the United
States of America as represented by the United States
Atomic Energy Commission
Filed Aug. 24, 1962, Ser. No. 219,827
3 Claims. (Cl. 176—24)

This invention relates to control systems and more particularly to an arrangement for increasing the reliability and decreasing the risks in the control and operation of neutronic reactors.

The reactor control systems presently in use on reactors at many sites are direct derivations of the control circuits and arrangemnets developed for the high flux reactor more than 10 years ago. Newsom et al., Patent No. 2,985,574. Although these instruments provide the necessary control and safety, the requirements of high performance testing and power reactors and the desire to utilize more modern techniques and components have created a need for improvement instruments. As a result a completely new concept of safety control and regulation is necessary.

Normally, a servo-circuit governs the position of the regulating or shim rod in response to the desired power level and the level as measured by the various detecting chambers. If one component in the servo-circuit fails, proper regulation of the reactor is endangered.

Applicant with the knowledge of these problems of the prior art has for an object of his invention the provision of a reactor control system utilizing redundant instruments in a series of parallel independent control channels.

Applicant has as another object of his invention the provision of a neutronic reactor control system where the failure of a single component will not render the system inoperative.

Applicant has as a further object of his invention the provision of a control system for a neutronic reactor having a plurality of similar control channels arranged so that concurrence of at least two channels is required to initiate action.

Applicant has as a still further object of his invention the provision of a control system for a neutronic reactor employing a plurality of similar parallel channels arranged to obviate false operation while permitting testing of the circuitry during operation.

Other objects and advantages of my invention will appear from the following specification and accompanying drawings, and the novel features thereof will be particularly pointed out in the annexed claims.

Figure 1:
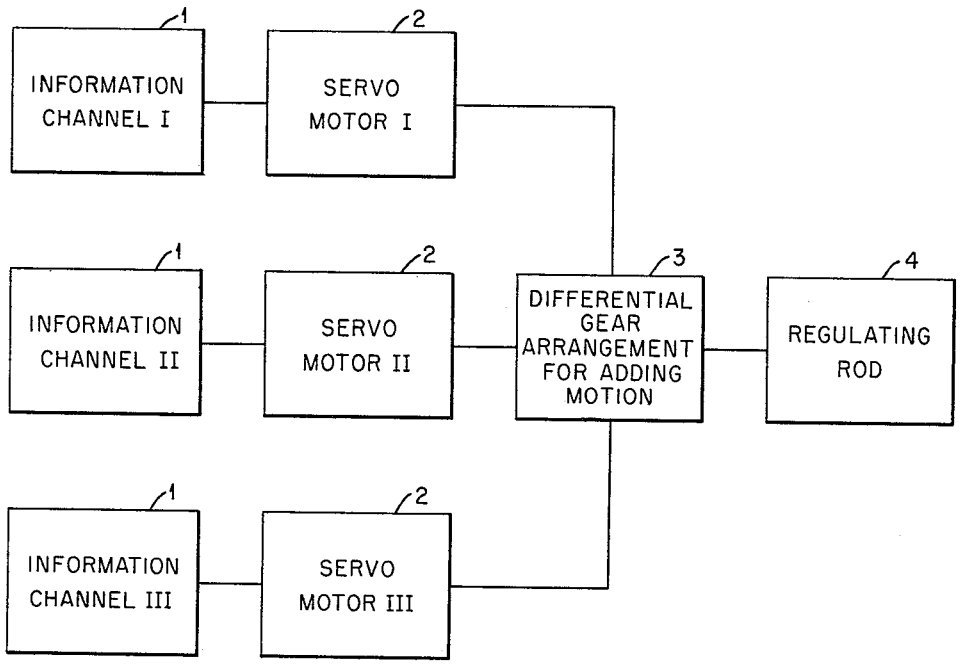
Figure 2:
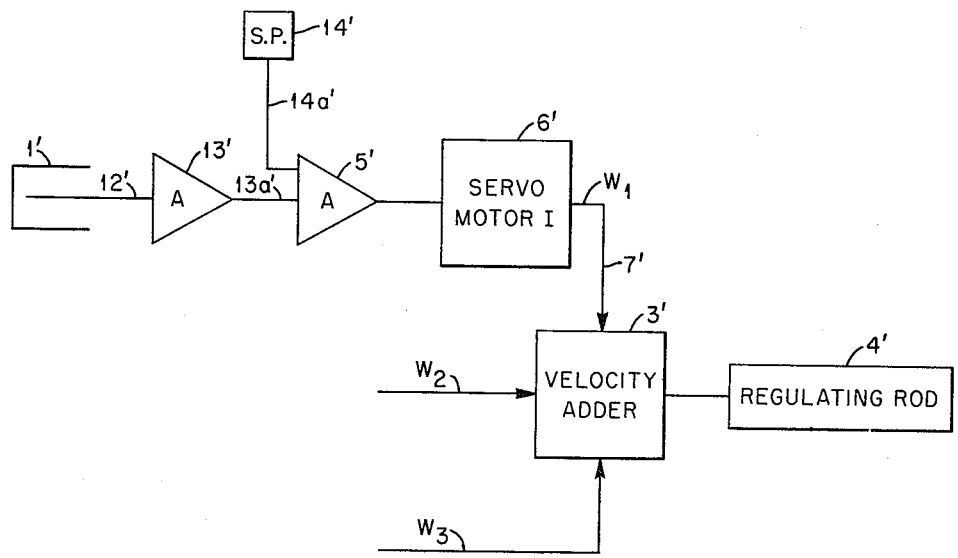

In the drawings, FIG. 1 is a block diagram of a control system for a regulating rod for control of a neutronic reactor. FIG. 2 is a block diagram of a modified control system for a neutronic reactor.

Applicant's system contemplates the use of at least three servo circuits or loops to control the operation of the regulating rod. The servo output velocities from these loops are added through the input mechanism to the regulating rod drive to provide a single output to drive the regulating rod for reactor regulation.

Referring to the drawings in detail, FIG. 1 shows a control system employing three similar control channels or loops. In each channel, 1 designates a sensing arrangement such as a thermocouple sensitive to heat, or a radiation detector sensitive to neutron, gammas, betas or alphas, or a pressure sensor responsive to changes in pressure. The output of this arrangement is fed to a conventional servo having a feedback loop biased to a standard voltage that is compared with the input signal sensing arrangement 1. The output velocity of servo motor 2 of each channel is fed to a common differential gear assembly 3 for combining their motions. The three servos 2, 2, 2, one in each of the three channels, can be constant speed motors, which at steady state, will not be running but can run either clockwise or counterclockwise depending upon the character of the signal fed thereto by the sensor 1. Since the cumulative action of two of the servos 2, 2 is required to cancel the action of the third servo and actuate the gear assembly 3, failure or erroneous operation of one of the three channels will not cause false operation of the gear assembly 3. Thus, the regulating rod 4 will only be moved in response to output of at least two servos 2.

The embodiment of the invention shown in FIG. 1 refers to servo system 2 and a differential gear arrangement 3 employing electromechanical actuators such as electrical motors and gear trains for adding rotational velocities. These devices could be replaced by hydraulic mechanisms which provide the same effects. Instead of electrical motors there would be fluid flow controllers, one for each branch, and the fluid flows would add in a chamber to move a piston attached to the regulating rod of the reactor. The chamber for adding fluid flows would be common to all three channels.

Referrig to the embodiment of FIG. 2, the current output of ionization chamber 1' is conducted by conductor 12' to the input of amplifier 13'. The output of amplifier 13' provides through conductor 13a' one input to the amplifier 5' of a servo system. Another input to this amplifier 5' is provided by a set point voltage 14' through line 14a' such that when the output voltage of amplifier 13' differs from this set point voltage the output of amplifier 15' differs from zero and drives the servo motor in either of two directions determined by the polarity of the output voltage from amplifier 15'. The motor velocity is proportional to the magnitude of the output voltage of amplifier 15'. Methods for optimizing the servo design are the conventional ones used for optimizing any single closed loop servo system.

The foregoing description is for one branch of the three servo reactor controller. The other two branches (not shown) are identical in principle but each has its own individual components. Items such as ion chamber 1', amplifiers 13' and 5', and servo motor 6', FIG. 1, are separate and independent for each of the three branches. Power supplies (not shown in FIG. 1) are separate and independent for each of the three branches. The purpose of the design providing for no common components in the three branches of the three servo controller is to provide a system so that failure of a component will not fail all three channels.

Since the three servos must provide motion for a single rod or group of rods, this rod as well as the device for adding the servo motor output velocities must be common to all three servo controllers.

Element 6' of FIG. 2 of the embodiment of the invention described in FIG. 2 can be a D.-C. motor which turns a shaft 7' with an angular velocity $W_1$. The angular velocities of branches 2 and 3 can be designated as $W_2$ and $W_3$. Any two of these output shafts can be made to drive a differential gear train similar to the differential gear train in an automobile so that the rotational velocity or angular speed of the power or drive shaft of this gear train is the algebraic sum of two angular speeds applied to the other two shafts. For example, if angular speeds $W_1$ and $W_2$ are input angular speeds then the output angular speed, i.e., the angular speed of the output or drive shaft is equal to $W_1+W_2$. This output angular speed can in turn be added by means of an identical differential gear train to $W_3$ to give a final angular speed of a shaft equal to $W_1+W_2+W_3$ which provides the motion to the regulating rod 41.

Having thus described my invention, I claim:
1. A control system for driving a regulating rod of neutronic reactor comprising a series of like signal channels responsive to changes in conditions in the reactor for producing signals, a convertor with an output, said convertor being coupled to the signal channels for converting the signals to mechanical power, and means for combining the outputs of the convertors and responsive to the cumulative effect of the outputs of at least two convertors for translating the power fed thereto to mechanical motion for actuating a regulating rod of a reactor.

2. A control system for controlling the movement of a regulating rod of a neutronic reactor comprising a plurality of signal channels responsive to changes in conditions in the reactor, each of said channels including a servo motor with an output for supplying mechanical power for the operation of the regulating rod to alter its position, and a differential gear drive mechanically coupled to the outputs of the servo motors of said channels and to the regulating rod, said gear drive being operated in response to signals in at least two of said channels for actuating the regulating rod to position it in the reactor.

3. A control system for controlling the movement of a regulating rod of a neutronic reactor comprising a plurality of signal channels responsive to changes in conditions in the reactor, each of said channels including a servo with an output for supplying power to drive the regulating rod to alter its position, and a differential power drive for coupling the outputs of the servos to the regulating rod, said differential power drive responding to the resultant application of power from the servos to supply power for actuating the regulating rod in accordance with the cumulative power from at least two of the servos.

References Cited in the file of this patent
UNITED STATES PATENTS
1,881,011    Witthuhns _____ Oct. 4, 1932
OTHER REFERENCES IRE Transactions on Nucl. Sci., August 1958, "Thermal Power Control of the NRU Reactor," pp. 68–72, by Lennox et al.